United States Patent [19]

Nakane et al.

[11] Patent Number: 4,968,777
[45] Date of Patent: Nov. 6, 1990

[54] HALOGEN-CONTAINING POLYESTER RESIN COMPOSITION AND COVERED WIRE

[75] Inventors: Toshio Nakane, Fuji; Yukihiko Kageyama, Fujinomiya; Hiroaki Konuma, Shimizu; Kenji Hijikata, Mishima, all of Japan

[73] Assignee: Polyplastics Co., Ltd., Osaka, Japan

[21] Appl. No.: 291,229

[22] Filed: Dec. 28, 1988

[30] Foreign Application Priority Data

Dec. 28, 1987 [JP] Japan ................................ 62-335857

[51] Int. Cl.$^5$ ............................................ C08G 63/02
[52] U.S. Cl. ..................................... 528/272; 528/274; 528/286; 528/288; 528/299; 528/308; 528/322; 528/332; 524/706; 524/714; 524/722
[58] Field of Search ............... 528/272, 299, 308, 274, 528/286, 288, 322, 332; 524/706, 714, 722

[56] References Cited

U.S. PATENT DOCUMENTS 4,707,512 11/1987 Maruyama et al. ................. 524/504

Primary Examiner—John Kight, III
Assistant Examiner—S. Acquah
Attorney, Agent, or Firm—Birch, Stewart, Kolasch & Birch

[57] ABSTRACT

A resin composition being useful for coating on electrically conductive lines comprises (A) a halogen-containing polyester having a halogen content of 0.5 to 30 wt. % and being a polycondensation product of (a), (b) and (c) wherein (a) is a component composed mainly of an aromatic dicarboxylic acid or an ester forming derivative thereof,
(b) is a component composed mainly of an aliphatic glycol or an ester forming derivative thereof, and
(c) is a component composed of an ester forming compound containing a halogen and 0.1 to 10 wt. %, based on the total composition, of (B) at least one carbodiimide compound.

14 Claims, No Drawings

HALOGEN-CONTAINING POLYESTER RESIN COMPOSITION AND COVERED WIRE

The present invention relates to a covering material for an electric wire and more particularly to a polyester resin composition comprising a halogen-containing flame retardant aromatic polyester copolymer and a carbodiimide compound incorporated therein which does not suffer any flexibility loss due to thermal history and has excellent flame retardancy, and an electric wire covered with the same.

[PRIOR ART]

Rubber, polyvinyl chloride, polyethylene, polypropylene, nylon, etc., have hitherto been used as a wire covering material. In particular, polyvinyl chloride has extensively been used for this application from the viewpoint of flame retardancy and mechanical strengths. In recent years, with an increase in the severity of the environment under which the above-described covering materials are used, requirements for the properties of the covering material include not only excellent thermal resistance and electrical characteristics but also flame retardancy and an excellent thin-wall forming property necessary for realizing space saving have been increased.

Although fluororesin, crosslinked polyethylene, etc., can meet the above-described requirements, they are unsatisfactory in that they are both poor in the thin-wall forming property and the fluororesin is expensive.

Attention has been paid to polyethylene terephthalate and polybutylene terephthalate because they are excellent in the thin-wall forming property as well as in the mechanical strengths (flexibility, abrasion resistance, etc.), thermal resistance, and electrical characteristics. However, these terephthalates are insufficient in the flame retardancy. Further, since they are crystalline resins, the heat history including heat treatment after covering a wire and heating during the use of the covered wire brings about a remarkable lowering in flexibility. This in turn brings about a lowering in the mechanical strengths such as impact resistance. For this reason, their use in the vicinity of heat sources and in an environment having a danger of heat buildup should be avoided, which more or less imposes restrictions on the use of these materials.

In order to overcome the above-described drawbacks, attempts have been made on the addition of an elastomer for the purpose of lowering the crystallinity even to a small extent and on partial crosslinking for the purpose of maintaining the stability of the mechanical strengths.

The former expedient brings about some improvements, but is disadvantageous in that it is impossible to withstand long-term heat history since the crystalline resin matrix remains as it is and, further, the lowering in the proportion of the crystalline resin brings about a lowering in the mechanical properties such as abrasion resistance.

The latter expedient brings about some improvements in the stability of the mechanical strengths, but is disadvantageous in that the flexibility is spoiled and the fabricability is remarkably lowered because of the complexity of control of the crosslinking reaction.

[SUMMARY OF THE INVENTION]

In view of the above-described problems, the present inventors have made extensive and intensive studies with a view toward developing a covering material for an electric wire which does not suffer any flexibility loss due to thermal history and is flame-retardant and excellent in the mechanical and electrical characteristics and, as a result, have found that the addition of a particular compound to a halogen-containing flame retardant aromatic copolyester enables the preparation of the above-described covering material, which has led to the completion of the present invention.

The resin composition of the present invention comprises (A) 90 to 99.9 wt.% of a halogen-containing polyester having a halogen content of 0.5 to 30 wt. % and being a polycondensation product of (a), (b) and (c):
- (a) a component composed mainly of an aromatic dicarboxylic acid or an ester forming derivative thereof,
- (b) a component composed mainly of an aliphatic glycol or an ester forming derivative thereof, and
- (c) a component composed of an ester forming compound containing a halogen; and, incorporated therein,
- (B) at least one carbodiimide compound having at least one carbodiimide group in its molecule in an amount of 0.1 to 10% by weight based on the total amount of the composition, and an electric wire covered with the same.

It is very difficult to simultaneously satisfy the characteristic requirements for wire covering material applications as in the present invention, i.e., various characteristics such as flame retardancy, frictional and abrasion resistance, and flexibility (flexing property and high percentage elongation) and characteristics such that initial high percentage elongation and flexing property are maintained without causing any flexibility loss due to heat history even when exposed to a heating atmosphere for a long period of time. Therefore, it is surprising that a combination of a halogenated copolyester of a polyalkylene terephthalate as component (A) with a carbodiimide compound as component (B) in a certain proportion enables the various characteristics required for a wire covering material to be satisfied, particularly, the addition of a carbodiimide compound as component (B) enables the stability in a long-term exposure to a heating atmosphere to be remarkably improved through the prevention of the flexibility loss due to heat history.

The polyester copolymer composition used in the present invention will now be described in greater detail.

At the outset, the components constituting the aromatic polyester copolymer, i.e., component (A), as a base substance of the composition of the present invention will be described. Component (a) is composed mainly of an aromatic dicarboxylic acid or an ester forming derivative thereof. Representative examples thereof include terephthalic acid and derivatives thereof. Besides these examples, other dicarboxylic acids such as isophthalic acid and naphthalenedicarboxylic aCid and derivatives thereof, fatty acids such as adipic acid, sebacic acid, trimellitic acid, and succinic acid and ester forming derivatives thereof, and aromatic hydroxy carboxylic acids such as hydroxybenzoic acid and hydroxynaphthoic acid and ester forming derivatives thereof may be optionally used as an auxiliary.

Next, component (b) constituting the polyester copolymer of the present invention is composed mainly of an aliphatic diol or an ester forming derivative thereof. A representative substance as component (b) is a low molecular weight glycol having 2 to 8 carbon atoms, and examples thereof include diols such as ethylene glycol, 1,4-butylene glycol, 1,3-propanediol, 1,4-butenediol, 1,6-hexanediol, and 1,8-octanediol. These low molecular weight glycols may be used in combination with high molecular weight glycols, such as polyalkylene oxide glycols, e.g., polyethylene oxide glycol and polybutylene oxide glycol. A combined use of the above-described high molecular weight glycols is very useful for imparting flexibility through an improvement in the elongation of the aromatic polyester constituting the wire covering material of the present invention. Further, aromatic alcohols such as bisphenol A, 4,4'-dihydroxybiphenyl, and phenyl 1,4-dihydroxyphosphinate, an adduct of an alcohol with an alkylene oxide such as an adduct of bisphenol A with 2 mol of ethylene oxide and an adduct of bisphenol A with 2 mol of propylene oxide, and polyhydroxy compounds such as glycerin and pentaerythritol or ester forming derivatives thereof may be used as an auxiliary of component (b).

The polyester copolymer constituting the composition of the present invention is an aromatic polyester copolymer having a halogen bonded to its molecule through the use of component (c) comprising a halogen-containing ester forming compound as a monomer. Examples of the halogen-containing compound used for this purpose include the following compounds. The halogen is particularly preferably bromine.

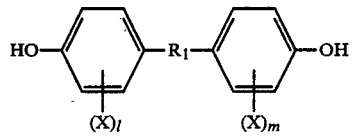     (1)

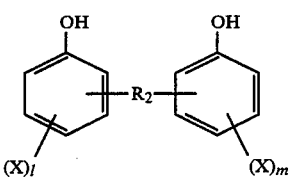     (2)

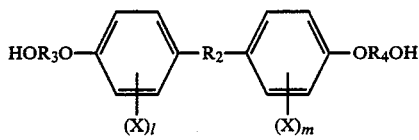     (3)

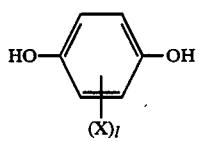     (4)

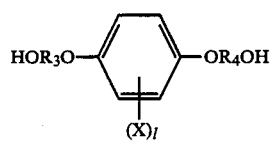     (5)

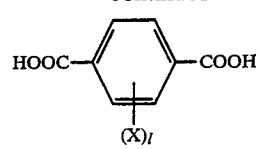     (6)

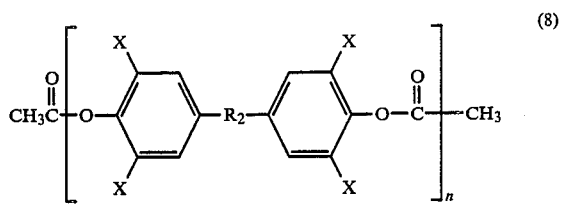     (8)

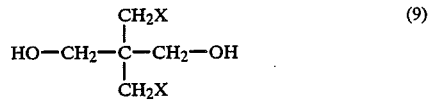     (9)

In the above formulae, $R_1$ and $R_2$ are each $$-CH_2-, \quad -\underset{\underset{CH_3}{|}}{\overset{\overset{CH_3}{|}}{C}}-,$$

—O—, —S—, or —SO$_2$—;

$R_3$ and $R_4$ are each —C$_2$H$_4$—, —C$_3$H$_6$—, —(C$_2$H$_4$O)$_n$—, or —(C$_3$H$_6$O)$_n$—;

X is a halogen;

l and m are each 1 to 4; and n is an integer of 1 or more.

Halogen compounds which are preferable for incorporation as a comonomer are those represented by the general formulae (1) to (7).

When bromine is used as the halogen, examples of the compound represented by the general formula (1) include tetrabromobisphenol A and tetrabromobisphenol sulfone, examples of the compound represented by the general formula (2) include tetrabromobisphenol F, examples of the compound represented by the general formula (3) include an adduct of tetrabromobisphenol A with 2 mol of ethylene oxide, an adduct of tetrabromobisphenol A with 2 mol of propylene oxide, an adduct of tetrabromobisphenol sulfone with 2 mol of ethylene oxide, and an adduct of tetrabromobisphenol sulfone with 2 mol of propylene oxide, examples of the compound represented by the general formula (4) include tetrabromohydroquinone, examples of the compound represented by the general formula (5) include an adduct of tetrabromohydroquinone with 2 mol of ethylene oxide, examples of the compound represented by the general formula (6) include tetrabromoterephthalic acid, and examples of the compound represented by the general formula (7) include polycarbonate of tetrabromobisphenol A.

It is preferred that the molecular weight of the halogen compound monomer to be incorporated as a comonomer be 390 or more. When the molecular weight is too small, the incorporation of the halogen compound does not contribute to an improvement in the oxygen index serving as a measure of the flame retardancy. Therefore, it is preferred that the halogen compound contain at least one aromatic ring in its molecule.

These halogen compounds are added so that the halogen content of the resultant copolyester be 0.5 to 30% by weight, preferably 2 to 20% by weight. When the halogen content is less than 0.5% by weight, sufficient flame retardancy cannot be attained, while when it exceeds 30% by weight, the mechanical properties are unfavorably lowered.

With respect to the proportion of the monomers for preparation of a polyester copolymer used in the present invention, it is preferred that when the ester forming functional group of the halogen compound as component (c) is alcoholic, the total amount of components (b) and (c) be 90 to 200 mol, preferably 95 to 150 mol based on 100 mol of component (a). On the other hand, when the ester forming functional group of the halogen compound as component (c) is carboxylic, the amount of component (b) is 90 to 200 mol, preferably 95 to 150 mol based on 100 mol of the total amount of components (a) and (c).

When a covering material having a high oxygen index is necessary depending upon service conditions, a covering material satisfying the index requirement can be prepared by adjusting the halogen content of the copolymer through proper determination of the content of component (c).

The copolymer used in the present invention can be prepared by polymerization through conventional processes such as solution polymerization, interfacial polymerization, and solid phase polymerization and has an intrinsic viscosity of about 0.5 to 3.0.

The carbodiimide compound as compound (B) is a compound having at least one carbodiimide group in its molecule. A high molecular carbodiimide compound (having a molecular weight of at least 194 or more) wherein monomers are bonded to each other through a carbodiimide group is particularly preferable.

Examples of the monomeric carbodiimide compound include alkyl-substituted carbodiimides such as dicyclohexylcarbodiimide and aryl-substituted carbodiimide such as diphenylcarbodiimide, while examples of the high molecular weight carbodiimide include a polycarbodiimide derived from a monomer having at least two isocyanate groups.

Examples of the polycarbodiimide include poly(hexamethylenedicarbodiimide), poly(cyclohexylenedicarbodiimide), poly(tolylcarbodiimide), poly(p-phenylenecarbodiimide), poly(m-phenylenecarbodiimide), poly(4,4'-diphenylmethanecarbodiimide), poly(3,3'-dimethyl-4,4'-diphenylmethanecarbodiimide), and mixtures thereof.

Poly(tolylcarbodiimide), poly(4,4'-diphenylmethanecarbodiimide), and mixtures thereof are preferable as the polycarbodiimide.

At least one of these carbodiimides may be added to the flame retardant aromatic polyester copolymer.

There is no particular limitation with respect to the degree of polymerization, and carbodiimides of both oligomeric and polymeric types can be used.

The carbodiimide compound as component (B) is added in an amount of 0.1 to 10% by weight, preferably 0.1 to 5% by weight based on the total amount of the composition. When the amount is too small, the intended effect cannot be attained, while when it is too large, there occur problems such as a remarkable increase in the viscosity and an increase in the amount of decomposition products.

The carbodiimide compound as component (B) may be added in preparing the above-described aromatic copolyester, or alternatively it may be added and mixed during preparation of pellets.

Although the composition of the present invention exhibits excellent performances even when no additive is used, if necessary, stabilizers such as antioxidants and ultraviolet absorbers, antistatic agents, flame retardants, flame retardant aid, colorants such as dyes and pigments, lubricants and lubricating agents for improving flowability and releasability, crystallization promoters (nucleating agents), inorganic materials, etc., may be used for the purpose of further improving the performances. In particular, when an antioxidant is added in combination with a carbodiimide compound, a further improved effect can be attained.

Hindered phenol, amine and phosphorus compounds, etc., may be used as the stabilizer.

Examples of the hindered phenol include 2,2'-methylenebis(4-methyl-6-tert-butylphenol), hexamethylene glycol bis(3,5-di-tert-butyl-4-hydroxyhydrocinnamate), tetrakis[methylene(3,5-di-tert-butyl-4-hydroxyhydrocinnamate)]methane, triethylene glycol bis-3-(3-tert-butyl-4-hydroxy-5-methylphenyl)proponate, 1,3,5-trimethyl-2,4,6-tris(3,5-di-tert-butyl-4-hydroxybenzyl)benzene, n-octadecyl 3-(4'-hydroxy-3',5'-di-tert-butylphenyl)propionate, 4,4'-methylenebis(2,6-di-tert-butylphenol), 4,4'-butylidenebis(6-tert-butyl-3-methylphenol), 2,2'-thiodiethyl bis[3-(3,5-di-tert-butyl-4-hydroxyphenol)propionate], distearyl 3,5-di-tert-butyl-4-hydroxybenzylphosphonate, and 2-tert-butyl-6-(3-tert-butyl-5-methyl-2-hydroxybenzyl)-4-methylphenyl acrylate, and at least one of them may be used. Among these, hexamethylene glycol bis(3,5-di-tert-butyl-4-hydroxyhydrocinnamate), tetrakis [methylene(3,5-di-tert-butyl-4-hydroxyhydrocinnamate)]-methane, and triethylene glycol bis-3-(3-tert-butyl-4-hydroxy-5-methylphenyl)propionate are particularly preferable substances.

Examples of the amine compound include N-phenyl-N'-isopropyl-p-phenylenediamine, N'N'-diphenyl-p-phenylenediamine, 4,4'-bis(4-α,α-dimethylbenzyl)-diphenylamine, a product of a condensation reaction of diphenylamine with acetone, N-phenylnaphthylamine, and N,N'-β-naphthylphenylenediamine.

Examples of the phosphorus compound include a phosphonite compound represented by the following general formula (9):

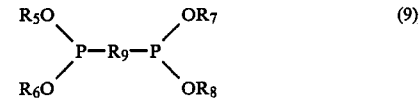

In the formula, $R_5$, $R_6$, $R_7$, and $R_8$ which may be the same or different are each an alkyl group having 1 to 25 carbon atoms, a substituted alkyl group, an aryl group, or a substituted aryl group. Examples of the group include methyl, ethyl, butyl, octyl, decyl, lauryl, tridecyl, stearyl, phenyl, and alkyl-and/or alkoxy-substituted phenyl groups. $R_9$ is an alkylene group having 4 to 33 carbon atoms, a substituted alkylene group, an arylene group or a substituted arylene group, and examples thereof include butylene, octylene, phenylene, naphthylene, and diphenylene groups and a group represented by the following formula:

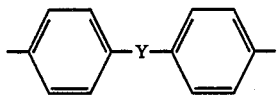

wherein Y is an oxy, sulfonyl, carbonyl, methylene, ethylidene, butylidene, isopropylene, or diazo group. A particularly preferred phosphonite compound is tetrakis(2,4-di-tert-butylphenyl) 4,4'-diphenylenephosphonite.

The amount of addition of the phosphorus compound is 0.01 to 5% by weight, preferably 0.1 to 3% by weight based on the total amount of the composition.

Examples of the flame retardant aid include antimony compounds such as antinomy trioxide and antimony halide, metallic compounds containing zinc and bismuth, magnesium hydroxide, clayey silicates, such as asbestos, and halogen-containing polymers such as brominated polycarbonate and brominated epoxy resin.

Examples of the inorganic material include ordinary inorganic fibers such as glass fibers, ceramic fibers, boron fibers, potassium titanate fibers, and asbestos, particulate materials, such as calcium carbonate, highly dispersible silicate, alumina, aluminum hydroxide, talc, clay, mica, glass flake, glass powder, glass bead, quartz powder, quartz sand, wollastonite, carbon black, barium sulfate, plaster of paris, silicon carbide, alumina, boron nitrite, and silicon nitrite, flaky inorganic compounds, and whisker.

These inorganic fillers may be used alone or in combination of two or more of them.

At least one organic polymeric material can be used as an auxiliary for the purpose of improving drape in melt extrusion, lubricity, and flexibility. Examples of the organic polymeric material include polyesters other than those mentioned above, polyamides, polyolefins and their copolymers, low molecular weight polyethylene, polycarbonate, polyurethane, butyl rubber, rubber-like polymeric materials such as ABS, multi-phase copolymers, thermoplastic segment type copolyesters (including graft copolymers), etc.

The electric wire of the present invention is prepared by known processes. In general, a travelling conductor is covered with a covering material by melt extrusion. In this case, there are two methods of covering the wire with the covering material, i.e., a method in which the direction of travel of the conductor is even with the direction of extrusion and a method in which a cross head having a constant angle is used. The electric wire of the present invention can be prepared by either method.

The extruder is preferably a screw extruder because the flow rate of the covering material can be easily controlled thereby.

The unevenness of the thickness of the covering material is detected by known methods with X ray, ultrasonic wave, etc The eccentricity due to an uneven thickness is expressed by concentricity $e_c$. A larger value of $e_c$ represents better results. The $e_c$ value is preferably 65% or more, more preferably 70% or more.

$$e_c = \frac{e_{min}}{e_{max}} \times 100$$

wherein $e_{min}$: thickness of covered section
$e_{max}$: maximum thickness of covered section The unevenness of the thickness can be regulated by a method which comprises detecting the unevenness with an uneven thickness detector and automatically or manually adjusting the clearance between the die and the detector at the central portion of a screw extruder and a method in which the flow rate of the covering material is controlled together with pressure and temperature.

The use of a concentric head is also effective in reducing the unevenness of the thickness.

In preparing the electric wire of the present invention, if necessary, the covering material may be passed through a heating zone after application and shaping of the covering material for the purpose of further increasing the mechanical strengths. The temperature of the heating zone is below the melting point and above the glass transition temperature of the covering material.

[EFFECT OF THE INVENTION]

The halogen-containing resin composition of the present invention exhibits a remarkable improvement in preventing the lowering in the physical properties attributed to heat history over that of the conventional polyester covering material, which brings about the following excellent effects.

(1) The covering material is excellent in flame retardancy and less susceptible to the lowering in the physical properties attributed to heat history, which renders the covering material suitable for use in electric wires used in the vicinity of heat sources, engines of transports, heat buildup parts of electric appliances and the like.

(2) It is possible to reduce the thickness of the covering material without spoiling the mechanical and electrical characteristics and also to attain excellent flexing property, so that a remarkable increase can be attained with respect to effective utilization of a limited space. This renders the covering material useful for wire applications where information is highly integrated and there is a limitation on the space capacity, e.g., transports such as space rockets, airplanes, and automobiles, electric appliances, computers, and information-related devices (3) Since a halogen compound is incorporated into a copolymer, the covering material causes no oozing at high temperatures as opposed to the case of mere addition of a flame retardant, which enables not only the attainment of an excellent appearance but also a lowering in the covering cost because blocking between the electric wires themselves can be prevented during the preparation of a covered wire.

By virtue of the above-described features, the covering material according to the present invention not only can be use for the covering of electric wires in the field of transports, electric, electronic and information-related devices, various machines, etc. but also is suitable for use in materials for various apparatuses and parts which are required to have such properties as well.

[EXAMPLES]

The present invention will now be described with reference to the following Examples. Copolymers P, Q, and R used in these Examples were prepared as follows.

PREPARATION EXAMPLE 1

(Preparation of Copolymer P)

A reactor equipped with an agitator, a nitrogen inlet tube and a distilling tube was charged with 970 parts by weight of dimethyl terephthalate, 513 parts by weight of 1,4-butanediol, 158 parts by weight of an adduct of tetrabromobisphenol A with 2 mol of ethylene oxide, and 0.7 part by weight of tetrabutoxytitanium. The mixture was agitated in a stream of nitrogen at 160° C. for 30 min. The temperature was gradually raised to heat the mixture at a temperature ranging from 200 to 270° C. for 2 hr. Then, the supply of nitrogen was stopped. The reactor was gradually evacuated so that the pressure was lowered to 0.3 mmHg 30 min after the initiation of the evacuation. The reaction mixture was agitated for 3 hr under this pressure. The polymer thus prepared had an intrinsic viscosity of 1.0 and a bromine content of 6.5 % by weight.

PREPARATION EXAMPLE 2

(Preparation of Copolymer Q)

A reactor equipped with an agitator, a nitrogen inlet tube and a distilling tube was charged with 970 parts by weight of dimethyl terephthalate, 513 parts by weight of 1,4-butanediol, 171 parts by weight of an adduct of tetrabromobisphenol sulfone with 2 mol of propylene oxide, and 0.7 part by weight of tetrabutoxytitanium. The mixture was agitated in a stream of nitrogen at 160° C. for 30 min. The temperature was gradually raised to heat the mixture at a temperature ranging from 200 to 270° C. for 2 hr. Then, the supply of nitrogen was stopped. The reactor was gradually evacuated so that the pressure was lowered to 0.3 mmHg 30 min after the initiation of the evacuation. The reaction mixture was agitated at 270° C. for 3 hr under this pressure. The polymer thus prepared had an intrinsic viscosity of 1.1 and a bromine content of 6.3% by weight.

PREPARATION EXAMPLE 3

(Preparation of Copolymer R)

A reactor equipped with an agitator, a nitrogen inlet tube and a distilling tube was charged with 900 parts by weight of dimethyl terephthalate, 450 parts by weight of 1,4-butanediol, 50 parts by weight of polybutylene oxide glycol having an average molecular weight of 400, 158 parts by weight of an adduct of tetrabromobisphenol A with 2 mol of ethylene oxide, and 0.7 part by weight of tetrabutoxytitanium. The mixture was agitated in a stream of nitrogen at 180° C. for 30 min. The temperature was gradually raised to heat the mixture at a temperature ranging from 200 to 270° C. for 3 hr. Thereafter, the supply of nitrogen was stopped, and the reactor was gradually evacuated so that the pressure was lowered to 0.5 mmHg 15 min after the initiation of the evacuation. The reaction mixture was agitated for 6 hr under this pressure. The polymer thus prepared had an intrinsic viscosity of 1.0 and a bromine content of 6.3% by weight.

EXAMPLE 1

98.5 parts by weight of copolymer P was mixed in powdery form with 1.5 parts by weight of poly(tolylcarbodiimide) (hereinafter abbreviated to "PTCI"). The mixture was molten and homogeneously mixed by making use of an ordinary extruder to prepare pellets. A specimen was prepared from the resultant pellets by making use of an injection molding machine according to an ordinary method and subjected to evaluation of the physical properties.

The individual physical properties were measured by the following methods.

The tensile strength and percentage elongation (%) were measured according to ASTM D 638. The dielectric breakdown was measured by the short time method according to ASTM D 149, while the dielectric constant was measured according to DISO 1 kHz. The flame retardancy was evaluated as O when a flame went out within 30 sec in a test according to UL-94V and as X when the flame did not go out within 30 sec. The oxygen index was measured according to JIS K 7201. The surface configuration was evaluated as X when abnormal phenomena, such as bleeding or blistering, were observed in the surface after the specimen was allowed to stand at 120° C. for 72 hr and evaluated as O when no abnormal phenomenon was observed.

A specimen for the tensile test was stored in a thermostatic chamber of 120° C., and the percentage elongation and retention of elongation were measured 500 hr after the initiation of the storage in the same manner as that described above.

Further, a circular compact-stranded copper wire having an outer diameter of 1.9 mm was covered with a resin composition so as to have a wall thickness of 0.3 mm, thereby preparing an electric wire. The wire was stored in a thermostatic chamber of 120° C. 500 hr after the initiation of the storage, the wire was folded down 10 times at an angle of 90°, and the surface state of the wire was then examined to evaluate the flexing property. The flexibility of the wire was evaluated as X when cracking and fine cracking occurred and as O when no abnormal phenomenon occurred.

The results are shown in Table 1.

EXAMPLE 2

98.5 parts by weight of copolymer P was mixed in powdery form with 1.5 parts by weight of poly(4,4'-diphenylmethanecarbodiimide) (hereinafter abbreviated to "PPMCI"). The mixture was molten and homogeneously mixed by making use of an ordinary extruder to prepare pellets. The resultant resin composition was evaluated in the same manner as that of Example 1. The results are shown in Table 1.

EXAMPLES 3 TO 6

The evaluation of the resin composition was conducted in the same manner as that of Examples 1 and 2, except that the copolymers used herein were copolymers Q and R. The results are shown in Table 1.

EXAMPLES 7 TO 9

Triethylene glycol bis[3-(3-tert-butyl-5-methyl-4-hydroxyphenyl)propionate](Irganox ®245) was added as an antioxidant to each resin of Examples 1, 3, and 5 in an amount of 1.0 part by weight based on 100 parts by weight of the resin. Each resin composition thus prepared was evaluated in the same manner as that of Example 1. The results are shown in Table 1.

EXAMPLES 10 TO 12

The evaluation of a resin composition was conducted in the same manner as that of Example 1, except that the resin compositions used herein were those shown in Table 1. The results are shown in Table 1.

COMPARATIVE EXAMPLES 1 to 6

The evaluation of a resin composition was conducted in the same manner as that of Example 1, except that no bisepoxy compound was incorporated and the copolymers and the resin compositions used herein were those shown in Table 1. The results are shown in Table 1.

TABLE 1

| | | | | | | | Examples | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| resin composition | | | | | | | | | | | | | |
| resin used (pts. wt.) | | P | P | Q | Q | R | R | P | Q | R | P | P | P |
| | | 98.5 | 98.5 | 98.5 | 98.5 | 98.5 | 98.5 | 98.5 | 98.5 | 98.5 | 99.7 | 96 | 90 |
| carbodiimide | PTCI (pts. wt.) | 1.5 | — | 1.5 | — | 1.5 | — | 1.5 | 1.5 | 1.5 | 0.3 | 4 | 10 |
| compound | PPMCI (pts. wt.) | — | 1.5 | — | 1.5 | — | 1.5 | — | — | — | — | — | — |
| flame retardant (pts. wt.) | | — | — | — | — | — | — | — | — | — | — | — | — |
| stabilizer (pts. wt.) | | — | — | — | — | — | — | 1.0 | 1.0 | 1.0 | — | — | — |
| dielectric breakdown (kV/mm) | | 17 | 17 | 17 | 17 | 17 | 17 | 17 | 17 | 17 | 17 | 17 | 17 |
| dielectric constant | | 3.2 | 3.2 | 3.3 | 3.2 | 3.2 | 3.3 | 3.2 | 3.2 | 3.3 | 3.2 | 3.2 | 3.2 |
| flame retardancy | | O | O | O | O | O | O | O | O | O | O | O | O |
| oxygen index | | 27 | 27 | 27 | 27 | 27 | 27 | 27 | 27 | 27 | 27 | 27 | 27 |
| surface configuration | | O | O | O | O | O | O | O | O | O | O | O | O |
| tensile strength (kg/cm$^2$) | | 571 | 569 | 560 | 564 | 570 | 568 | 565 | 568 | 570 | 569 | 541 | 489 |
| elongation (%) | | 300< | 300< | 300< | 300< | 300< | 300< | 300< | 300< | 300< | 300< | 300< | 260 |
| after 500 hr | elongation (%) | 248 | 260 | 225 | 238 | 270 | 263 | 259 | 271 | 281 | 196 | 19 | 188 |
| at 120° C. | flexing property | O | O | O | O | O | O | O | O | O | O | O | O |

| | Comparative Examples | | | | | |
|---|---|---|---|---|---|---|
| | 1 | 2 | 3 | 4 | 5 | 6 |
| resin composition | | | | | | |
| resin used (pts. wt.) | P | Q | R | P | Q | R |
| | 100 | 100 | 100 | 99 | 99 | 99 |
| flame retardant (pts. wt.) | — | — | — | — | — | — |
| stabilizer (pts. wt.) | — | — | — | 1.0 | 1.0 | 1.0 |
| dielectric breakdown (kV/mm) | 17 | 17 | 17 | 17 | 17 | 17 |
| dielectric constant | 3.2 | 3.2 | 3.3 | 3.2 | 3.2 | 3.3 |
| flame retardancy | O | O | O | O | O | O |
| oxygen index | 27 | 27 | 27 | 27 | 27 | 27 |
| surface configuration | O | O | O | O | O | O |
| tensile strength (kg/cm$^2$) | 543 | 550 | 450 | 543 | 550 | 451 |
| elongation (%) | 300< | 300< | 300< | 300< | 300< | 300< |
| after 500 hr elongation (%) | 77 | 79 | 110 | 102 | 114 | 148 |
| at 120° C. flexing property | X | X | X | X | X | X |

We claim:

1. A halogen-containing polyester resin composition which consists essentially of:
    (A) a flame retardant aromatic polyester copolymer having a halogen content of 0.5 to 30 wt. % and being prepared by polycondensation of:
        (a) a component composed mainly of an aromatic dicarboxylic acid or an ester forming derivative thereof,
        (b) a component composed mainly of an aliphatic glycol or an ester forming derivative thereof, and
        (c) a component composed of an ester forming compound containing a halogen; and having incorporated therein,
    (B) at least one carbodiimide compound having at least one carbodiimide group in the molecule thereof in an amount of 0.1 to 10% by weight based on the total amount of the composition.

2. The resin composition according to claim 1, wherein said aliphatic glycol of component (b) is a low molecular weight glycol having 2 to 8 carbon atoms.

3. The resin composition according to claim 1, wherein said aliphatic glycol of component (b) is a low molecular weight glycol having 2 to 8 carbon atoms and a polyalkylene oxide glycol having a molecular weight of 200 to 4000.

4. The resin composition according to claim 2, wherein said low molecular weight glycol having 2 to 8 carbon atoms is at least one member selected from the group consisting of ethylene glycol, 1,4-butylene glycol and 1,4-butene glycol.

5. The resin composition according to any one of claims 1 to 4, wherein said halogen-containing ester forming compound of component (c) is a halogenated dicarboxylic acid or a halogenated glycol and derivatives thereof.

6. The resin composition according to any one of claims 1 to 4, wherein said halogen-containing ester forming compound of component (c) has 4 or more carbon atoms per molecule.

7. The resin composition according to any one of claims 1 to 4, wherein said halogen of component (c) is bromine.

8. The resin composition according to any one of claims 1 to 4, wherein said carbodiimide compound of (B) has a molecular weight of 194 or more.

9. The resin composition according to any one of claims 1 to 4, which further comprises 0.1 to 3% by weight of a stabilizer based on the total amount of the composition.

10. The resin composition according to claim 1, wherein aid carbodiimide of (B) is selected from the group consisting of an alkyl-substituted carbodiimide, an aryl-substituted carbodiimide and a polycarbodiimide.

11. The resin composition according to claim 1, wherein said carbodiimide of (B) is selected from the group consisting of dicyclohexylcarboiimide and dipheynylcarbodiimide.

12. The resin composition according to claim 1, wherein said carboddiimide of (B) is selected from the group consisting of poly(hexamethylenedicarbodiimide), poly(cyclohexylenedicarbodiimide), poly(tolylcarbodiimide), poly(p-phenylenecarbodiimide), poly(m-phenylenecarbodiimide), poly(4,4-diphenylmethanecarbodiimide), poly(3,3'-dimethyl-4,4'-diphenylmethanecarbodiimide) and mixtures thereof.

13. The resin composition according to claim 9, wherein the stabilizer is selected from the group consisting of a hindered phenol, an amine and a phosphorus compound.

14. The resin composition according to claim 1, which further comprises an additive selected from the group consisting of an antioxidant, an ultraviolet absorber, and antistatic agent, a flame retardant, a flame retardant aid, a colorant, a lubricant, a lubricant agent, a cyrstallization promoter and an inorganic material.

* * * * *